(12) United States Patent
Yoneta et al.

(10) Patent No.: US 11,351,542 B2
(45) Date of Patent: Jun. 7, 2022

(54) INSPECTION FLOW PATH DEVICE AND INSPECTION APPARATUS

(71) Applicant: KYOCERA Corporation, Kyoto (JP)

(72) Inventors: Masashi Yoneta, Kagoshima (JP);
Jumpei Nakazono, Kirishima (JP)

(73) Assignee: KYOCERA CORPORATION, Kyoto (JP)

(*) Notice: Subject to any disclaimer, the term of this patent is extended or adjusted under 35 U.S.C. 154(b) by 191 days.

(21) Appl. No.: 16/960,777

(22) PCT Filed: Jan. 25, 2019

(86) PCT No.: PCT/JP2019/002556
§ 371 (c)(1),
(2) Date: Jul. 8, 2020

(87) PCT Pub. No.: WO2019/151150
PCT Pub. Date: Aug. 8, 2019

(65) Prior Publication Data
US 2020/0330992 A1 Oct. 22, 2020

(30) Foreign Application Priority Data
Jan. 30, 2018 (JP) .............................. JP2018-013698

(51) Int. Cl.
*G01N 21/00* (2006.01)
*B01L 3/00* (2006.01)
(Continued)

(52) U.S. Cl.
CPC ........ *B01L 3/502761* (2013.01); *B01D 43/00* (2013.01); *G01N 15/1404* (2013.01);
(Continued)

(58) Field of Classification Search
CPC ............... G01N 21/53; G01N 15/0205; G01N 15/1459; G01N 21/51; G01N 15/1434
(Continued)

(56) References Cited

U.S. PATENT DOCUMENTS

| | | |
|---|---|---|
| 2005/0237521 A1 | 10/2005 | Hirono |
| 2015/0258791 A1* | 9/2015 | Togashi ............... B41J 2/14072 347/44 |
| 2016/0325278 A1 | 11/2016 | Takagi et al. |

FOREIGN PATENT DOCUMENTS

| | | |
|---|---|---|
| JP | 2005-331506 A | 12/2005 |
| JP | 2008-244165 A | 10/2008 |

(Continued)

*Primary Examiner* — Md M Rahman
(74) *Attorney, Agent, or Firm* — Volpe Koenig

(57) ABSTRACT

An inspection flow path device according to the present disclosure comprises: a first flow path device having a plate-like shape and including a pair of first surfaces located opposite to each other in a thickness direction and a first flow path located inside and including a first opening located in the pair of first surfaces and a branch flow path; and a second flow path device having a plate-like shape and translucency and including a pair of second surfaces located opposite to each other in a thickness direction and a second flow path located inside and including a second opening located in the pair of second surfaces; wherein one of the pair of first surfaces of the first flow path device is located on one of the pair of second surfaces of the second flow path device, and the first opening and the second opening are connected to each other.

17 Claims, 12 Drawing Sheets

(51) Int. Cl.
  *B01D 43/00* (2006.01)
  *G01N 15/14* (2006.01)
  *G01N 15/00* (2006.01)
(52) U.S. Cl.
  CPC ............... *B01L 2200/0652* (2013.01); *B01L 2300/0654* (2013.01); *B01L 2300/168* (2013.01); *G01N 2015/008* (2013.01); *G01N 2015/149* (2013.01)
(58) Field of Classification Search
  USPC ....................................................... 356/338
  See application file for complete search history.

(56) References Cited

FOREIGN PATENT DOCUMENTS

| | | | |
|---|---|---|---|
| JP | 2012-076016 A | 4/2012 |
| JP | 2014-006085 A | 1/2014 |
| WO | 2010/144814 A2 | 12/2010 |
| WO | 2015/098720 A1 | 7/2015 |

\* cited by examiner

F I G. 5
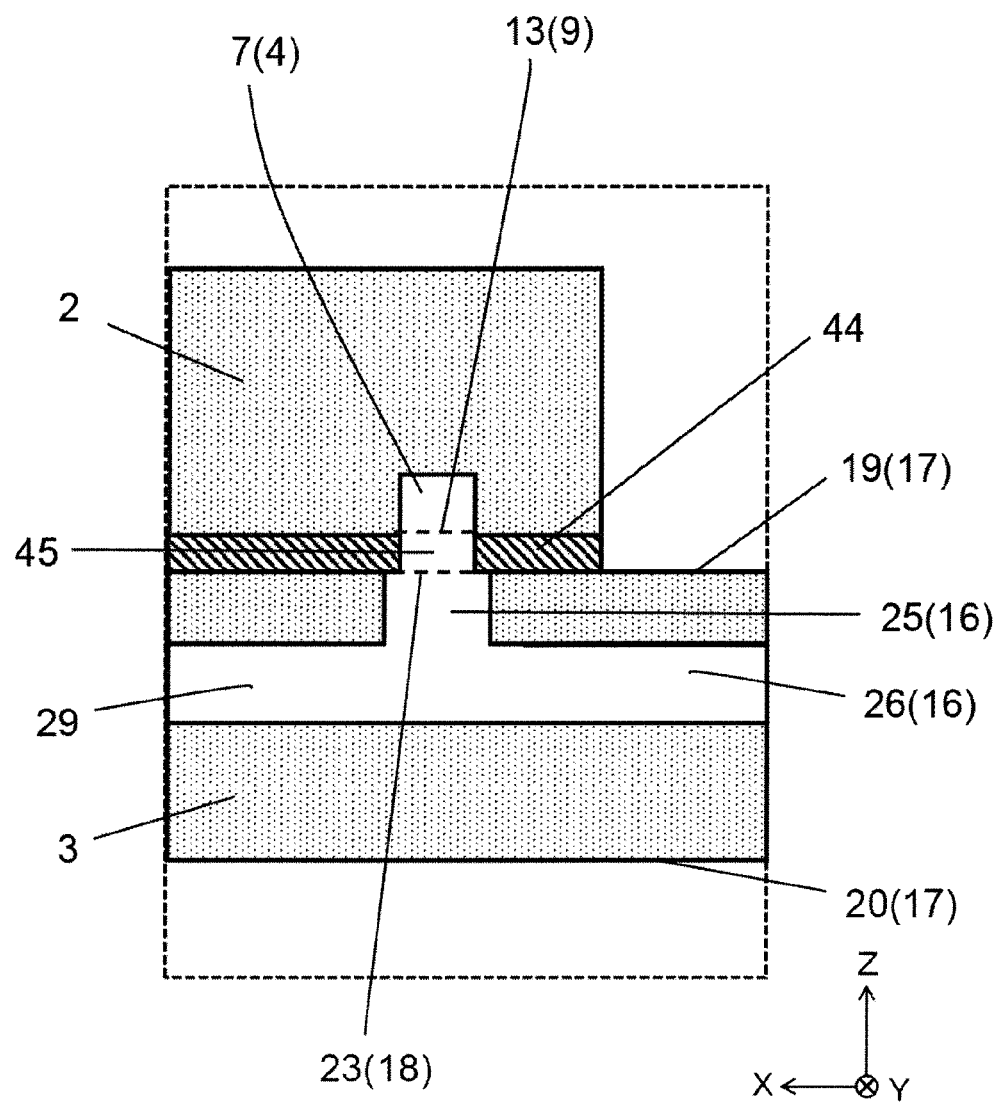

F I G. 1 2
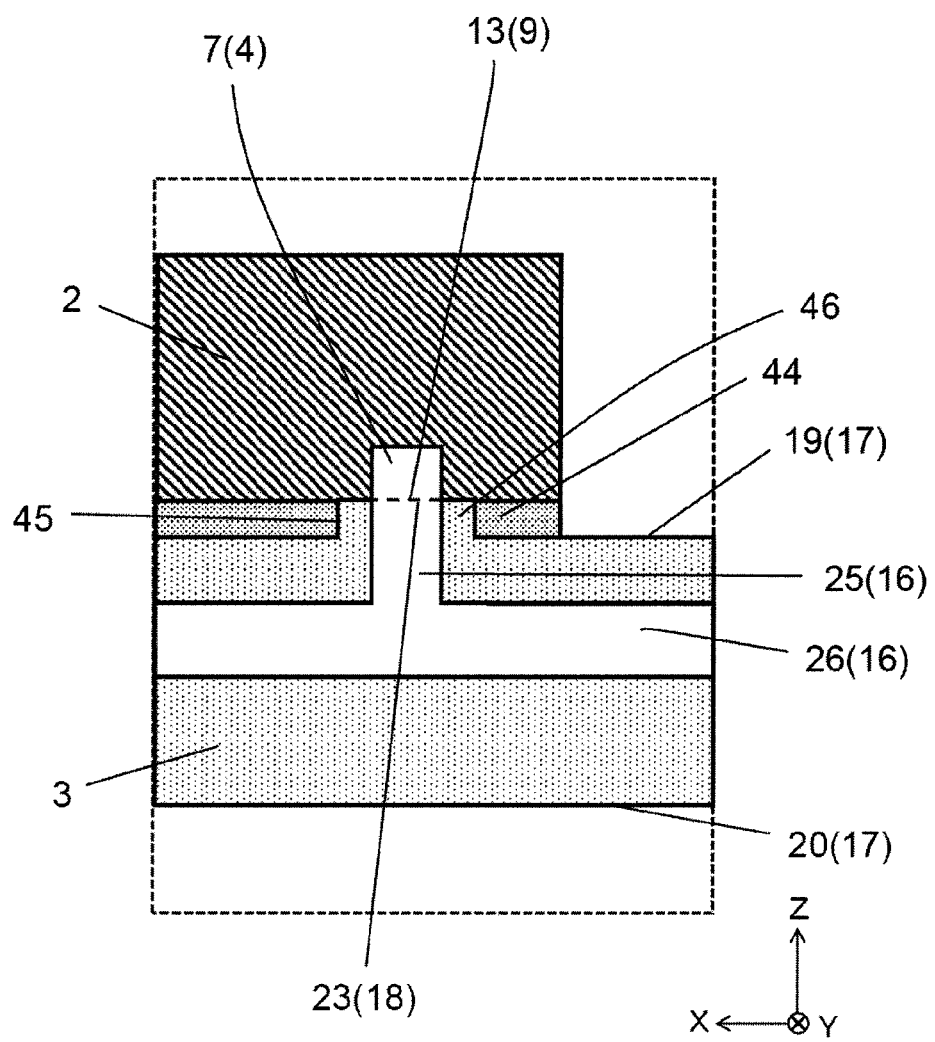

INSPECTION FLOW PATH DEVICE AND INSPECTION APPARATUS

CROSS-REFERENCE TO RELATED APPLICATION

The present application is a National Phase entry based on PCT Application No. PCT/JP2019/002556, filed on Jan. 25, 2019, entitled "INSPECTION FLOW CHANNEL DEVICE AND INSPECTION APPARATUS", which claims the benefit of Japanese Patent Application No. 2018-013698, filed on Jan. 30, 2018, entitled "INSPECTION FLOW CHANNEL DEVICE AND INSPECTION APPARATUS". The contents of which are incorporated by reference herein in their entirety.

FIELD

Embodiments of the present disclosure relate generally to an inspection flow path device and an inspection apparatus.

BACKGROUND

A separation and recovery of microparticles are conventionally known. A measurement of microparticles is known.

SUMMARY

An inspection flow path device and an inspection apparatus are disclosed. In one embodiment, an inspection flow path device comprises a first flow path device and a second flow path device. The first flow path device has a plate-like shape and includes a pair of first surfaces located opposite to each other in a thickness direction of the first flow path device and a first flow path located inside the first flow path device and including a first opening located in the pair of first surfaces and a branch flow path. The second flow path device has a plate-like shape and translucency and includes a pair of second surfaces located opposite to each other in a thickness direction of the second flow path device and a second flow path located inside the second flow path device and including a second opening located in the pair of second surfaces. One of the pair of first surfaces is located on one of the pair of second surfaces, and the first opening and the second opening are connected to each other.

In one embodiment, an inspection apparatus includes the inspection flow path device described above and an optical sensor irradiating the second flow path with light and receiving light passing through the second flow path.

BRIEF DESCRIPTION OF THE DRAWINGS

FIG. 5 illustrates a cross-sectional view showing a part of the example of the inspection flow path device according to the one embodiment of the present disclosure.

FIG. 12 illustrates a cross-sectional view showing a part of an example of an inspection flow path device according to the other embodiment of the present disclosure.

DETAILED DESCRIPTION

Examples of an inspection flow path device and an inspection apparatus according to embodiments of the present disclosure are described with reference to the drawings. In the present disclosure, a rectangular coordinate system (X, Y, Z) is defined for descriptive purposes to define a positive side in a Z axis direction as an upper side, however, in the present disclosure, any direction may be the upper side or a lower side. The following contents illustrate embodiments of the present disclosure, and the present disclosure is not limited to these embodiments.

(Inspection Flow Path Device)

Figure 1:
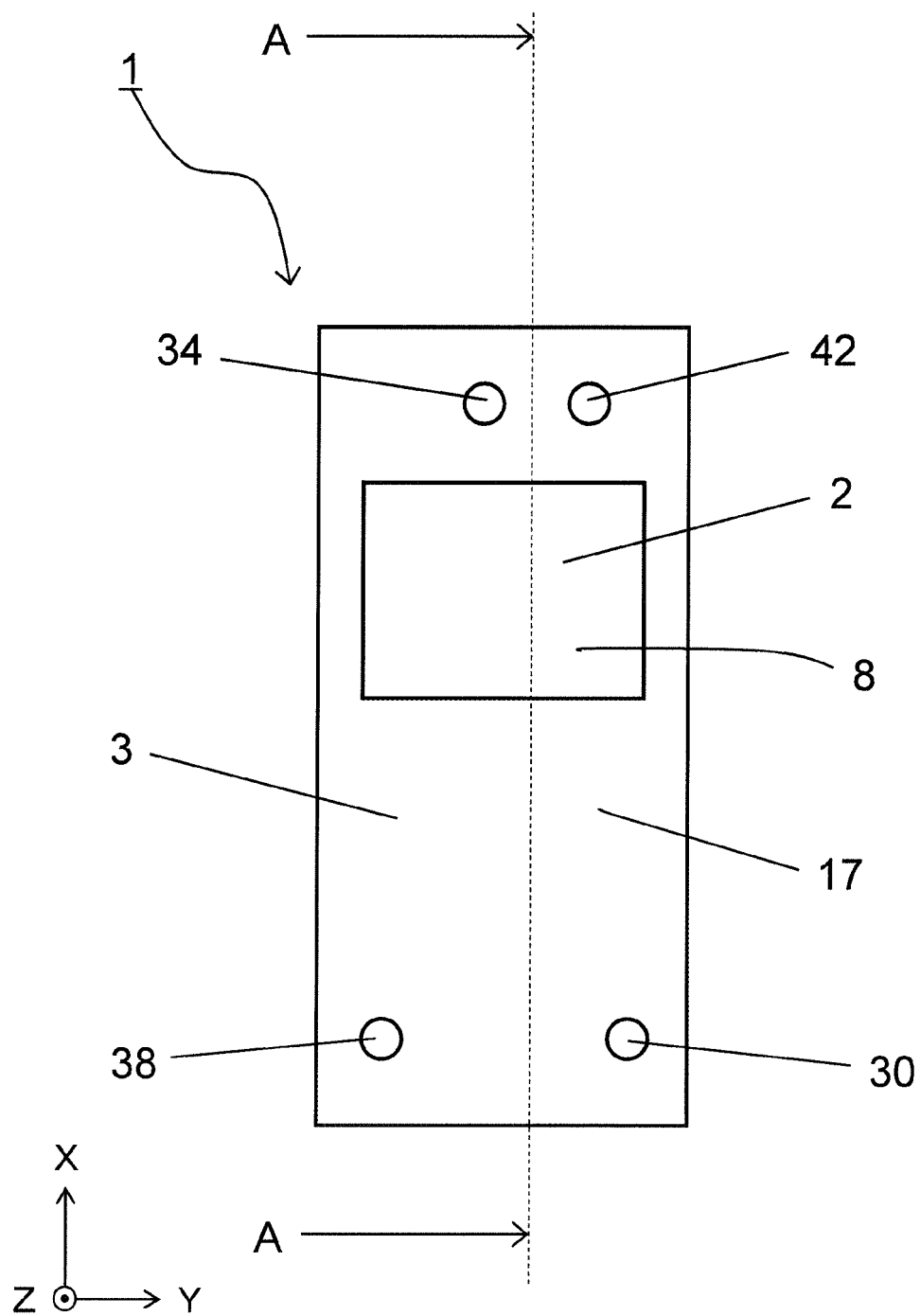
FIG. 1 illustrates a top view showing an example of an inspection flow path device according to one embodiment of the present disclosure.
Figure 2:
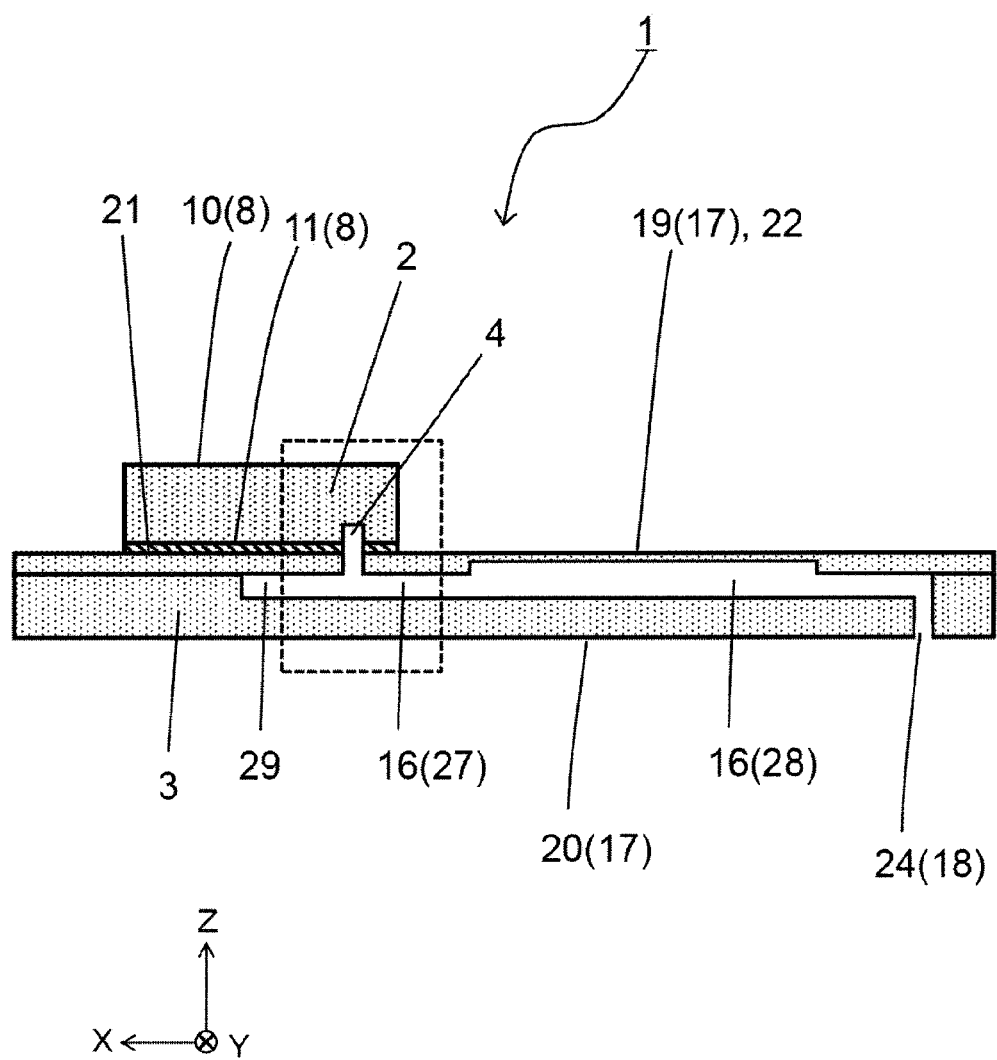
FIG. 2 illustrates a cross-sectional view showing the example of the inspection flow path device according to the one embodiment of the present disclosure.

FIG. 1 and FIG. 2 schematically illustrate an inspection flow path device 1. FIG. 1 is a top view of the inspection flow path device 1, and FIG. 2 is a cross-sectional view of the inspection flow path device 1 cut along an A-A line in FIG. 1.

When a fluid (a sample) to be inspected is flowed in the inspection flow path device 1, the inspection flow path device 1 can separate and recovery a specific component (microparticles) in the sample, and measure the recovered specific component (microparticles). For example, the inspection flow path device 1 can separate and recover white blood cells (leukocyte) from blood, and measure the number of white blood cells included in the blood. The inspection flow path device 1 includes a first flow path device 2 and a second flow path device 3 connected to the first flow path device 2.

Figure 3:
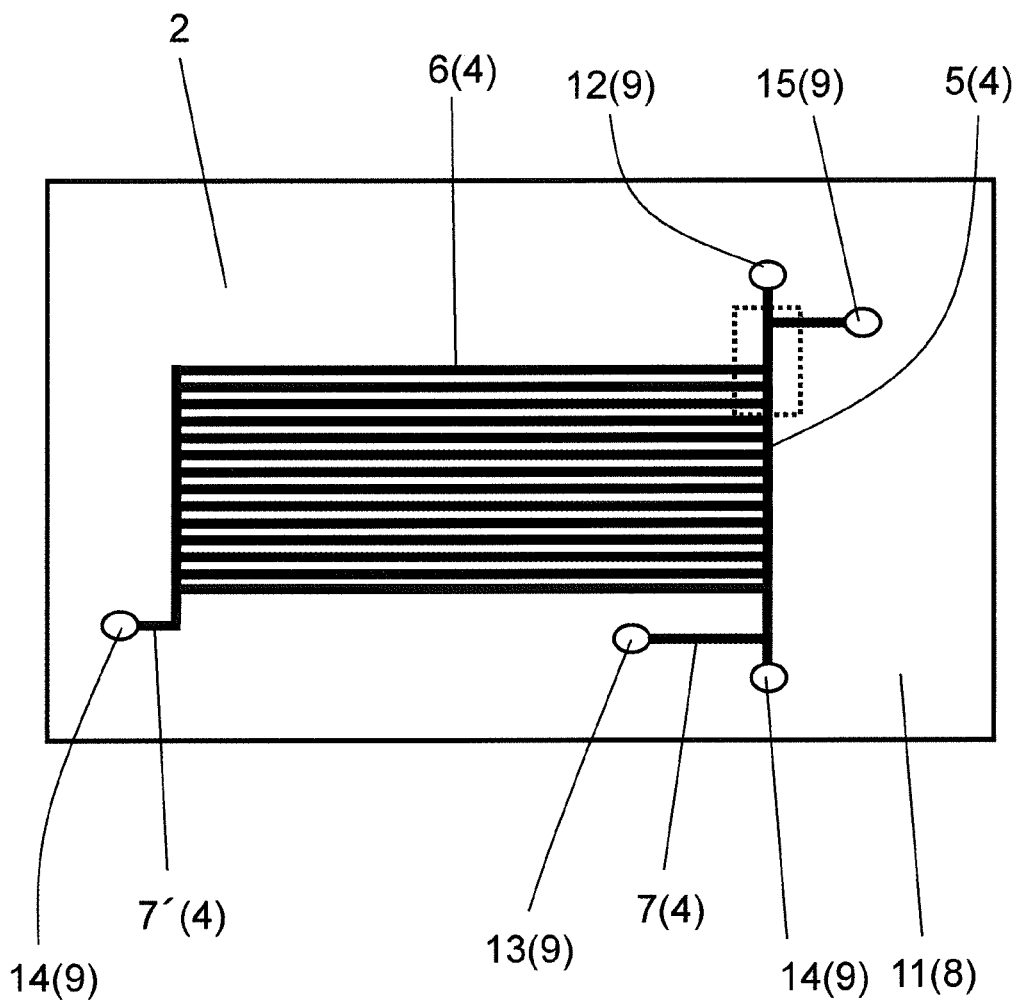
FIG. 3 illustrates a top view showing an example of a first flow path device according to the one embodiment of the present disclosure.

FIG. 3 schematically illustrates the first flow path device 2. FIG. 3 is a plan view of the first flow path device 2 when seen from an upper surface transparently.

(First Flow Path Device)

The first flow path device 2 can separate and recovery microparticles in a fluid (sample). The first flow path device 2 includes a first flow path 4. The first flow path 4 includes a main flow path (first main flow path) 5 and a branch flow path (first branch flow path) 6 branching from the first main flow path 5. In the first flow path device 2 in the present disclosure, the fluid flowing in the first flow path device 2 flows into the first main flow path 5, and only microparticles (second particles) different from the specific microparticles (first particles) flow from the first main flow path 5 into the first branch flow path 6, thus the specific microparticles (first particles) can be separated. When the microparticles (second particles) different from the specific microparticles (first particles) flow into the first branch flow path 6, the first flow path device 1 can also separate the different microparticles (second particles).

The first branch flow path 6 is designed so that only the second particles are branched and flow therein, however, only the second particles are not necessarily branched. That is to say, microparticles different from the second particles may flow into the first branch flow path 6 in some cases.

Figure 4:
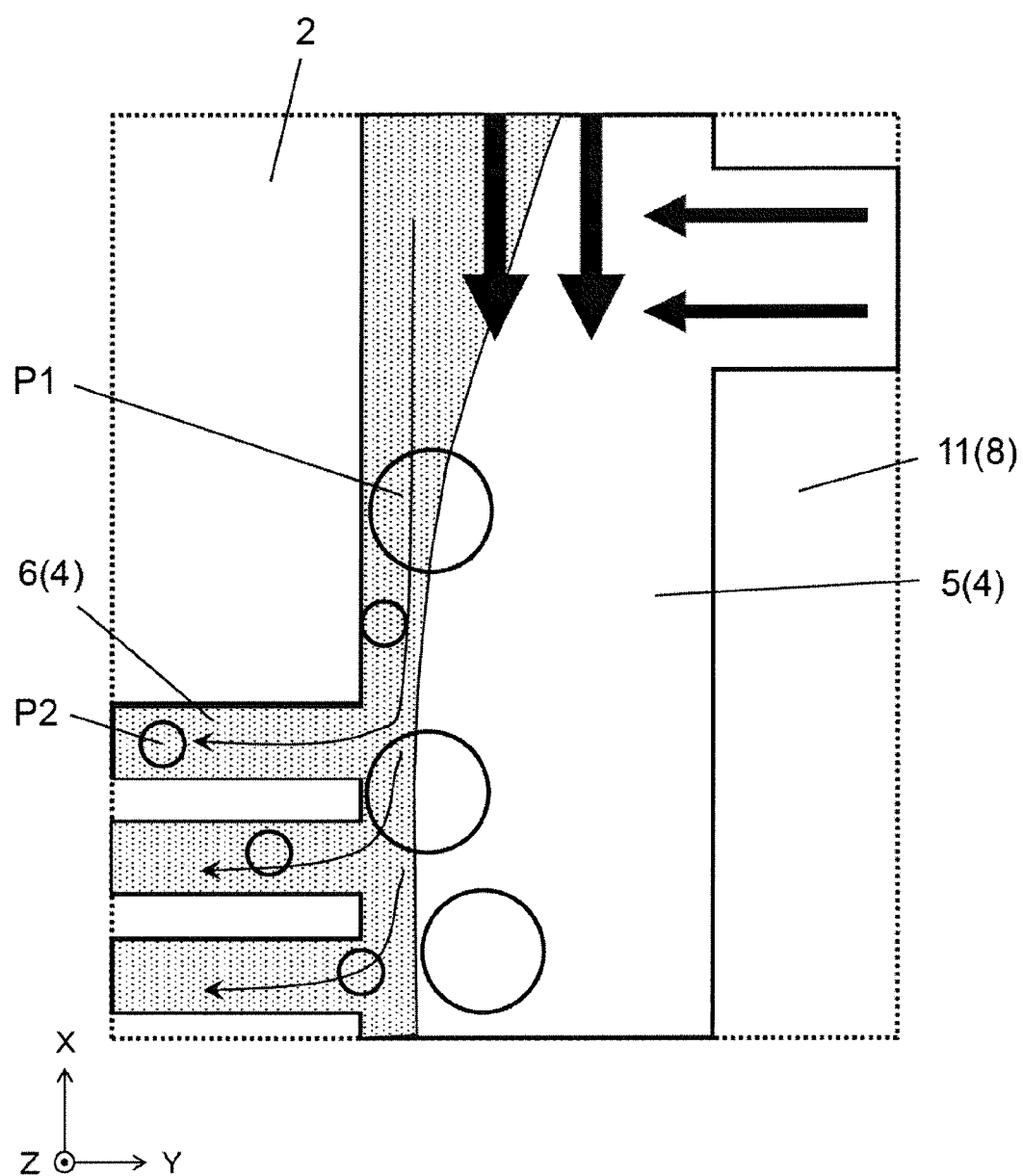
FIG. 4 illustrates a top view showing a part of the example of the first flow path device according to the one embodiment of the present disclosure.

FIG. 4 schematically illustrates a process of separating the first particles and the second particles. FIG. 4 is an enlarged view of a broken line section in FIG. 3. Herein, a large circle in FIG. 4 indicates the first particle P1 and a small circle indicates the second particle P2. A thick arrow along the X axis direction indicates a main stream and a thin arrow along the Y axis direction indicates a "pressing flow" described hereinafter. A hatched region in FIG. 4 indicates a "lead-in flow" described hereinafter.

The first flow path 4 in the present disclosure includes one first main flow path 5 and the plurality of first branch flow path 6 connected to one side of the one first main flow path 5. In the first flow path device 2, a sectional area and length of each of the first main flow path 5 and the first branch flow path 6, a flow rate of the sample and the like are adjusted, thus the "lead-in flow", which flows from the first main flow path 5 into the first branch flow path 6 can be generated in the first main flow path 5. The first flow path device 2 generates the pressing flow, which can press the sample flowing in the first main flow path 5 against a side of the first branch flow path 6, in the first flow path 4. As a result, as illustrated in FIG. 4, a width of the lead-in flow is set to larger than a barycentric position of the specific microparticle (the first particle P1) flowing in the sample and smaller than a barycentric position of the other microparticle (the second particle P2), thus the other microparticles (the second particle P2) can be lead in the first branch flow path 6. At this time, a width of the first branch flow path 6 is set to smaller than a size of the specific microparticle (the first particle P1) flowing in the sample and larger than a size of the other microparticle (the second particle P2), thus the other microparticles (the second particle P2) can be lead in the first branch flow path 6.

The first flow path device 2 in the present disclosure is particularly intended to separate red blood cells (erythrocyte) and white blood cells (leukocyte) in blood. A barycentric position of the red blood cell in the blood is located 2 to 2.5 μm from an edge thereof, for example, and the size of the red blood cell is 6 to 8 μm, for example. A barycentric position of the white blood cell is located 5 to 10 μm from an edge thereof, for example, and the size of the white blood cell is 10 to 30 μm, for example. In this case, the first main flow path 5 may have the sectional area ranging from 300 $\mu m^2$ to 1000 $\mu m^2$ and the length ranging from 0.5 mm to 20 mm, for example. The first branch flow path 6 may have the sectional area ranging from 100 $\mu m^2$ to 500 $\mu m^2$ and the length ranging from 3 mm to 25 mm, for example. The flow rate in the first flow path 4 may be equal to or larger than 0.2 m/s and equal to or smaller than 5 m/s, for example. As a result, the width of the lead-in flow can be set equal to or larger than 2 μm and equal to or smaller than 15 μm, for example, thus the red blood cell and the white blood cell in the blood can be separated.

The first flow path 4 further includes a first recovery flow path 7 connected to the first main flow path 5, and can recovery the first particles P1. In the first flow path 4 in the present disclosure, the first particles P1 can be recovered in the first recovery flow path 7 using the pressing flow.

The first flow path 4 may include a first disposal flow path 7' connected to the plurality of first branch flow paths 6. The first disposal flow path 7' may recover or dispose of the separated second particles P2. When the second particles P2 are recovered by the plurality of first branch flow paths 6, one first disposal flow path 7' to which the plurality of first branch flow paths 6 are connected functions as a flow path for recovering the second particles P2. The fluid flowing to an end of the first main flow path 5 may be disposed of.

The first flow path device 2 is a plate-like member. The first flow path 4 is located inside the plate-like member. The first flow path device 2 includes a pair of first surfaces 8 located opposite to each other in a thickness direction (the Z axis direction). The first flow path 4 is opened in the pair of first surfaces 8. In other words, the first flow path 4 includes a plurality of first openings 9 located in the pair of first surfaces 8.

In the present disclosure, one of the pair of first surfaces 8 is defined as a first upper surface 10 and the other one thereof is defined as a first lower surface 11 for descriptive purposes. In the pair of first surfaces 8, the first upper surface 10 is a surface located on a positive side of the Z axis and the first lower surface 11 is a surface located on a negative side of the Z axis. In the present disclosure, at least one of the plurality of first openings 9 is located in the first lower surface 11.

The plurality of first openings 9 include a first flow inlet (first sample flow inlet) 12 through which the sample flows into at least the first main flow path 5, a first flow outlet (a first sample flow outlet) 13 through which the first particles P1 are recovered from the first recovery flow path 7, and at least one first disposal flow outlet 14 through which constituents in which the first particles P1 are removed from the sample are recovered. Included in the present disclosure is a first pressing flow inlet 15 through which the fluid of the pressing flow for pressing the sample against the first branch flow path 6 side flows. In the present disclosure, the first disposal flow outlet 14 is connected to the first main flow path 5 and the first disposal flow path 7'. The fluid flowing out through the first disposal flow outlet 14 is recovered through a through hole 14' formed in the second flow path device 3.

A planar shape of the first flow path device 2 in the present disclosure is a rectangular shape. Each of the first surfaces 8 in the present disclosure is a flat surface. A planar shape of the first flow path device 2 is not limited to the rectangular shape. Each of the first surfaces 8 in the present disclosure is not limited to the flat surface. In the first surfaces 8, shapes of the first upper surface 10 and the first lower surface 11 may be different from each other.

The first flow path device 2 may be formed of a material of polydimethylsiloxane (PDMS) or acrylic (PMMA), for example. A thickness of the first flow path device 2 may be equal to or larger than 1 mm and equal to or smaller than 5 mm, for example. The planar shape of the first flow path device 2 may have a short side with a length equal to or larger than 10 mm and equal to or smaller than 30 mm and a long side with a length equal to or larger than 10 mm and equal to or smaller than 50 mm, for example. The first flow path device 2 can be formed by preparing two substrates, forming a groove in one of the two substrates, and attaching the two substrates to each other to cover the groove, for example.

(Second Flow Path Device)

The second flow path device 3 is a flow path for measuring the specific microparticles separated and recovered in the first flow path device 2. As illustrated in FIG. 2, the second flow path device 3 includes a second flow path 16 connected to the first flow path 4 in the first flow path device 2. The second flow path device 3 has translucency. As a result, the second flow path device 3 can flow the specific microparticles separated and recovered in the first flow path device 2 to the second flow path 16 and the specific microparticles can be measured by using an optical sensor described hereinafter. Specifically, the optical sensor measures intensity of light passing through the second flow path 16, thereby measuring the specific microparticles.

The second flow path device 3 is a plate-like member. The second flow path 16 is located inside the plate-like member. The second flow path device 3 includes a pair of second surfaces 17 located opposite to each other in a thickness direction (the Z axis direction). The second flow path 16 is opened in the pair of second surfaces 17. In other words, the second flow path 16 includes a plurality of second openings 18 located in the pair of second surfaces 17.

In the present disclosure, one of the pair of second surfaces 17 is defined as a second upper surface 19 and the other one thereof is defined as a second lower surface 20 for descriptive purposes. In the pair of second surfaces 17, the second upper surface 19 is a surface located on a positive side of the Z axis and the second lower surface 20 is a surface located on a negative side of the Z axis.

A planar shape of the second flow path device 3 in the present disclosure is a rectangular shape. Each of the second surfaces 17 in the present disclosure is a flat surface. A planar shape of the second flow path device 3 is not limited to the rectangular shape. Each of the second surfaces 17 in the present disclosure is not limited to the flat surface. In the second surfaces 17, shapes of the second upper surface 19 and the second lower surface 20 may be different from each other.

The second flow path device 3 may be formed of acrylic (PMMA) or cycloolefin polymer (COP), for example. A thickness of the second flow path device 3 may be equal to or larger than 0.5 mm and equal to or smaller than 5 mm, for example. The planar shape of the second flow path device 3 may have a short side with a length equal to or larger than 10 mm and equal to or smaller than 30 mm and a long side with a length equal to or larger than 20 mm and equal to or smaller than 50 mm, for example. The second flow path device 3 can be formed by preparing two substrates, forming a groove in one of the two substrates, and attaching the two substrates to each other to cover the groove, for example.

FIG. 5 schematically illustrates the first flow path device 2 and the second flow path device 3. FIG. 5 is an enlarged view of a broken line section in FIG. 2.

In the second flow path device 3 in the present disclosure, at least one of the plurality of second openings 18 is located in the second upper surface 19. The first flow path device 2 is located on the second upper surface 19 via the first lower surface 11, and the first opening 9 located in the first lower surface 11 and the second opening 18 located in the second upper surface 19 are connected to each other. Accordingly, in the inspection flow path device 1 in the present disclosure, the first flow path device 2 is directly connected to the second flow path device 3, and the process from the separation and recovery to the measurement of the specific microparticles in the sample can be continuously performed, thus a work efficiency can be improved. The plate-like first flow path device 2 and second flow path device 3 are located to be stacked in the thickness direction, thus the inspection flow path device 1 can be minimized.

The second upper surface 19 of the second flow path device 3 in the present disclosure includes a first region 21 and a second region 22. In a plan view, the second flow path 16 in the second flow path device 3 is located to extend from the first region 21 to the second region 22, and in a transparent plan view, the second flow path 16 overlaps with the first region 21 and the second region 22. The first flow path device 2 is located only on the first region 21 in the second flow path device 3. As a result, the second flow path 16 is exposed to the second region 22, thus the second region 22 can be used as a measurement region.

In the inspection flow path device 1, a member which can reflect light may be located on the second region 22 as described hereinafter.

The first flow path device 2 may be formed of a material different from that of the second flow path device 3. In the present disclosure, for example, the first flow path device 2 is formed of PDMS and the like, and the second flow path device 3 is formed of COP and the like.

As is the case in the present disclosure, the first flow path device 2 may be located on an upper side of the second flow path device 3. Specifically, the first flow path device 2 may be located on the second upper surface 19 of the second flow path device 3. As a result, the specific microparticles in the sample separated and recovered in the first flow path device 2 can be flowed into the second flow path device 3 also using gravity, and a retention of the recovered microparticles midway through the flow path can be reduced.

The present disclosure does not exclude an embodiment in which the first flow path device 2 is located on the second lower surface 20 of the second flow path device 3.

The plurality of second openings 18 include a second sample flow inlet 23 through which the sample flows into the second flow path 16 and a second sample flow outlet 24 through which the sample is recovered from the second flow path 16. The second sample flow inlet 23 is located in the second upper surface 19, and is connected to the first sample flow outlet 13 in the first flow path device 2. The second sample flow outlet 24 is located in the second lower surface 20. As a result, by using the gravity, the sample can be easily flowed from the first flow path device 2 through the second sample flow inlet 23 and the sample can be easily recovered in the second sample flow outlet 24.

An opening of the second sample flow inlet 23 may be larger than an opening of the first sample flow outlet 13 as illustrated in FIG. 5. As a result, the retention of the sample can be reduced in a connection part between the first flow path device 2 and the second flow path device 3. A size of the second sample flow inlet 23 may be equal to or larger than 1 mm and equal to or smaller than 3 mm, for example. A size of the first sample flow outlet 13 may be equal to or larger than 1 mm and equal to or smaller than 3 mm, for example.

The second flow path 16 includes a vertical part 25 connected to the second sample flow inlet 23 (the second opening 18) and extending in the thickness direction and a planar part 26 connected to the vertical part 25 and extending along a planar surface direction. The second flow path 16 includes the vertical part 25, thereby being able to reduce the retention of the sample including the specific microparticles in the connection part between the second flow path 16 and the first flow path 4. The second flow path 16 includes the planar part 26, thereby being able to retain the sample including the specific microparticles, thus a stable measurement can be achieved.

A width of the vertical part 25 may be equal to or larger than 0.5 mm and equal to or smaller than 2 mm, for example, and a width of the planar part 26 may be equal to or larger than 1 mm and equal to or smaller than 6 mm, for example.

A length of the vertical part 25 may be equal to or larger than 0.5 mm and equal to or smaller than 1 mm, for example, and a height of the planar part 26 may be equal to or larger than 0.5 mm and equal to or smaller than 2 mm, for example.

Figure 6:
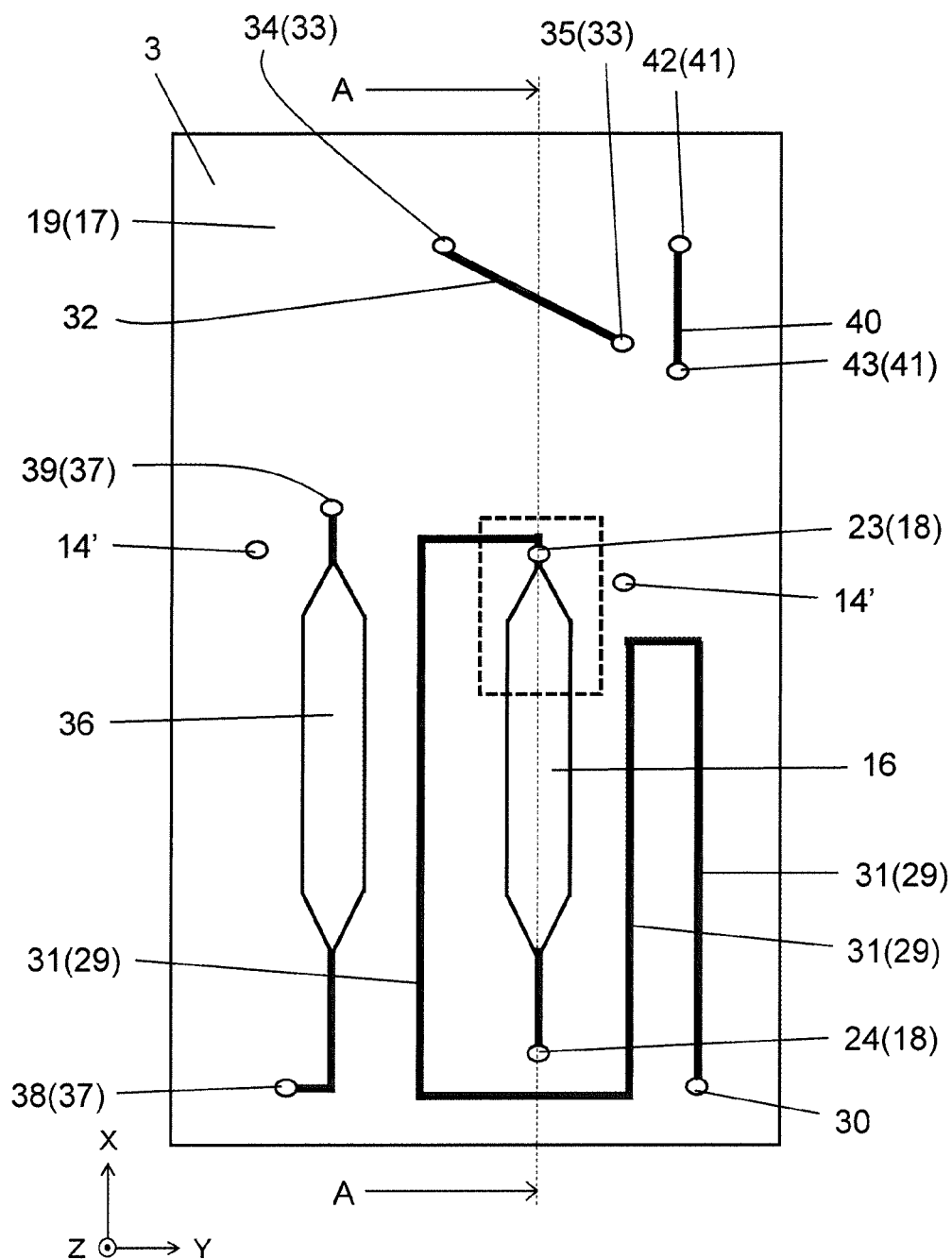
FIG. 6 illustrates a top view showing an example of a second flow path device according to the one embodiment of the present disclosure.
Figure 7:
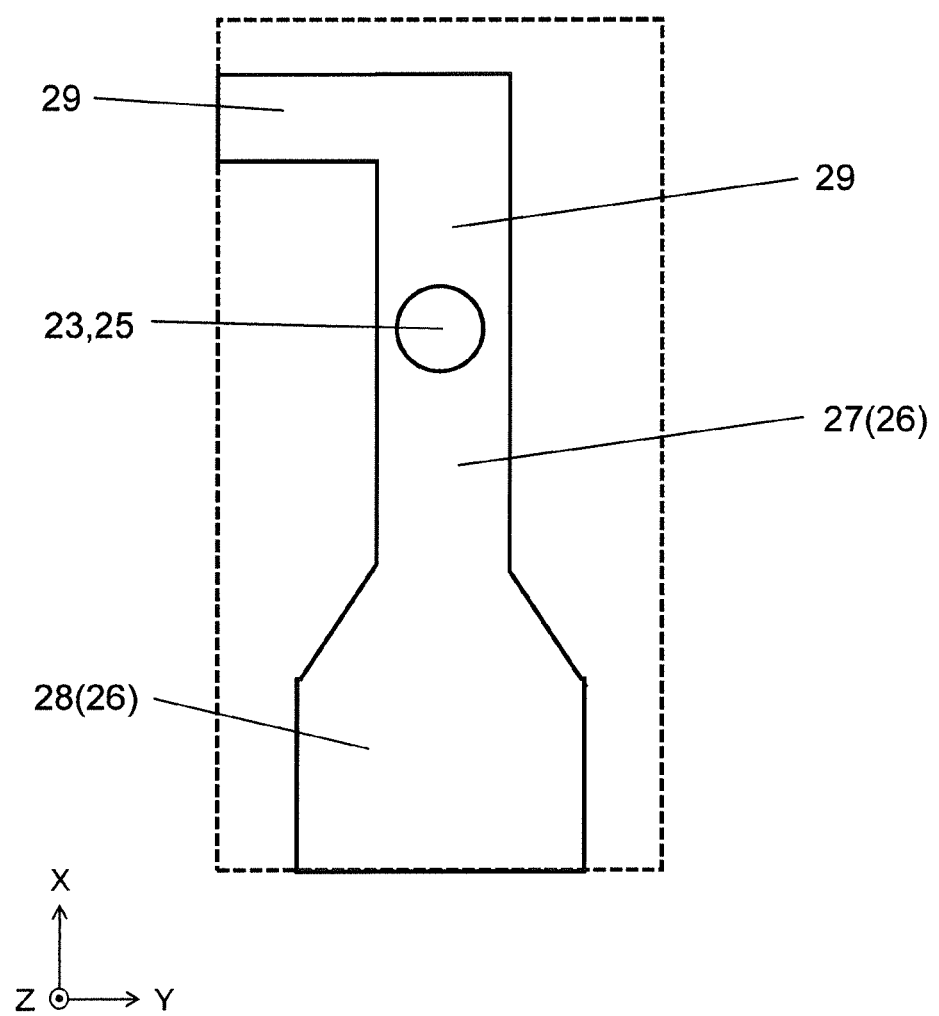
FIG. 7 illustrates a top view showing a part of the example of the second flow path device according to the one embodiment of the present disclosure.

FIG. 6 and FIG. 7 schematically illustrate the second flow path device 3. FIG. 6 is a plan view of the second flow path device 3 when seen from an upper surface transparently. FIG. 7 is an enlarged view of a broken line section illustrated in FIG. 6. An A-A line in FIG. 6 is the same as the A-A line in FIG. 1.

Part of the planar part 26 connected to at least the vertical part 25 may have a width larger than the vertical part 25. As a result, the retention of the sample can be reduced in a connection part between the planar part 26 and the vertical part 25.

The planar part 26 may further include a first planar part 27 connected to the vertical part 25 and a second planar part 28 connected to the first planar part 27 and having a width larger than the first planar part 27. As a result, the first particles P1 can be easily diffused. A width of the first planar part 27 may be equal to or larger than 0.5 mm and equal to or smaller than 3 mm, for example. A width of the second planar part 28 may be equal to or larger than 1 mm and equal to or smaller than 5 mm, for example. A width of the second planar part 28 may be twice or more and ten times or less than the first planar part 27, for example. In the present disclosure, a connection part between the first planar part 27 and the second planar part 28 is gradually widened.

The second planar part 28 may have a height larger than the first planar part 27. As a result, the first particles P1 can be easily diffused. A height of the first planar part 27 may be equal to or larger than 0.2 mm and equal to or smaller than 1 mm, for example. The height of the second planar part 28 may be equal to or larger than 1 mm and equal to or smaller than 5 mm, for example.

The second flow path device 3 may further include, in addition to the second flow path 16, a third flow path 29 connected to the second flow path 16. The third flow path 29 may be connected to the planar part 26 of the second flow path 16. The third flow path 29 has a function of sweeping away the sample reaching the planar part 26 by flowing gas, for example. As a result, the retention of the sample in the second flow path 16 can be reduced.

In the second flow path device 3 in the present disclosure, as illustrated in FIG. 5 and FIG. 7, the third flow path 29 is located to be connected to the connection part between the vertical part 25 and the planar part 26 in the second flow path 16.

One end of the third flow path 29 is connected to the second flow path 16 as described above. The other end of the third flow path 29 serves as a third opening 30 located in the pair of second surfaces 17. In other words, the third flow path 29 includes a third opening 30 located in one of the pair of second surfaces 17 (in the present disclosure, the second upper surface 19). The third opening 30 is an opening through which an extrusion fluid for sweeping away the sample is flowed in.

At least part of the third flow path 29 connected to the second flow path 16 may extend along an extension direction of the planar part 26 of the second flow path 16 as illustrated in FIG. 7.

At least part of the third flow path 29 connected to the second flow path 16 may have the same shape as at least part of the second flow path 16 connected to the third flow path 29. As a result, a level difference occurring between the second flow path 16 and the third flow path 29 and the retention of the sample in the level difference can be reduced.

The third flow path 29 may include a plurality of extension parts 31 each extending in one direction and arranged in a direction intersecting with one direction. The third flow path 29 includes the extension parts 31, thereby being able to reduce the sample flowing back from the second flow path 16 and leaked from the third opening 30.

The first sample flow inlet (first flow inlet) 12 of the first opening 9 may be located in a surface (the first lower surface 11 in the present disclosure) similar to that of the first sample flow outlet (first flow outlet) 13 of the first opening 9. In this case, the sample flows into the first flow path device 2 from below. As a result, the second particles P2 can be sunk when a specific gravity of the second particles P2 is larger than that of the first particles P1, thus the particles can be separated easily.

The second flow path device 3 may further include a fourth flow path 32 different from the second flow path 16 and the third flow path 29 as illustrated in FIG. 6. The fourth flow path 32 may include a plurality of fourth openings 33 located in the pair of second surfaces 17. The fourth flow path 32 can function as a flow path in which the sample before the microparticles are separated flows. As a result, the sample is flowed into the second flow path device 3 before flowed into the first flow path device 2, thus a foreign material and the like which have been mixed into the sample and the like to be injected can be previously reduced before flowed into a separation flow path.

The plurality of fourth openings 33 include a fourth flow inlet 34 and a fourth flow outlet 35. The fourth flow inlet 34 is an opening through which the sample flows into the fourth flow path 32. The fourth flow outlet 35 is an opening through which the sample flows from the fourth flow path 32. The fourth flow inlet 34 is exposed outside, and the fourth flow outlet 35 is connected to the first sample flow inlet (first flow inlet) 12 of the first flow path device 2.

The fourth flow inlet 34 and the fourth flow outlet 35 may be located in the second upper surface 19. The above configuration has a significant effect that an operation such as an external connection can be performed from above. In the present disclosure, the fourth flow inlet 34 is located in the same surface as that of the second sample flow inlet 23. In the present disclosure, the fourth flow outlet 35 is located in the same surface as that of the second sample flow inlet 23. The fourth flow inlet 34 is located in the same surface as that of the third opening 30.

The second flow path device 3 may further include a fifth flow path 36 different from the second flow path 16, the third flow path 29, and the fourth flow path 32 as illustrated in FIG. 6. The second flow path 16 is a flow path for flowing the specific microparticles separated and recovered in the first flow path device 2 as described above. This fifth flow path 36 can function as a flow path for correction. The fifth flow path 36 can flow a sample for correction different from the specific microparticles separated and recovered in the first flow path device 2. As a result, it is possible to measure the second flow path 16 and the fifth flow path 36 in sequence every time the specific microparticles are measured to estimate the number of specific microparticles in accordance with a difference of light intensity of the flow paths 16 and 36, thus an influence of deterioration of an optical sensor can be reduced.

The fifth flow path 36 includes a plurality of fifth openings 37 located in the pair of second surfaces 17. The fifth openings 37 include a fifth flow inlet 38 and a fifth flow outlet 39. The fifth flow inlet 38 is an opening through which a fluid for correction flows into the fifth flow path 36. The fifth flow outlet 39 is an opening through which a fluid for correction flows from the fifth flow path 36.

The fifth flow inlet 38 of the plurality of fifth openings 37 is located in the same surface as that of the third opening 30. As a result, an operation of introducing and exhausting the fluid can be performed on the same surface from above. The fifth flow outlet 39 is located in the second lower surface 20.

The second flow path device 3 may further include a sixth flow path 40 different from the second flow path 16, the third flow path 29, the fourth flow path 32, and the fifth flow path 36. The sixth flow path 40 includes a plurality of sixth openings 41 located in the pair of second surfaces 17. The plurality of sixth openings 41 include a sixth flow inlet 42 and a sixth flow outlet 43. The sixth flow inlet 42 is an opening through which a fluid of a pressing flow flows into the sixth flow path 40. The sixth flow outlet 43 is an opening through which a fluid of a pressing flow flows from the sixth flow path 40. The sixth flow inlet 42 is exposed outside, and the sixth flow outlet 43 is connected to the first pressing flow inlet 15 of the first flow path device 2.

The third flow path 29, the fourth flow path 32, and the fifth flow path 36 can be formed in the manner similar to the second flow path 16.

(Connection Structure of First Flow Path Device and Second Flow Path Device)

The first flow path device 2 is located on the second upper surface 19 of the second flow path device 3 as described above. Herein, a sheet member 44 may intervene between the first lower surface 11 of the first flow path device 2 and the second upper surface 19 of the second flow path device 3. In other words, the inspection flow path device 1 may include the sheet member 44 located between the first flow path device 2 and the second flow path device 3.

The sheet member 44 has a function as an intermediate layer for bonding hardly-adhesive materials. The sheet member 44 may be formed of a material such as silicone or PDMS, for example. The inspection flow path device 1 includes the sheet member 44, thereby being able to absorb a waviness of a surface of a bonding surface. The sheet member 44 includes a plurality of through holes 45. The plurality of through holes 45 may correspond to the plurality of first openings 9. As a result, the fluid flows between the first flow path device 2 and the second flow path device 3 via the through holes 45.

The first flow path device 2 and the second flow path device 3 in the present disclosure are connected via an adhesive agent applied to an upper surface and lower surface of the sheet member 44. It is sufficient that the adhesive agent is a photo-curable resin hardened by ultraviolet or a thermoplastic resin, for example.

(Inspection Apparatus)

An inspection apparatus 47 is described next.

Figure 8:
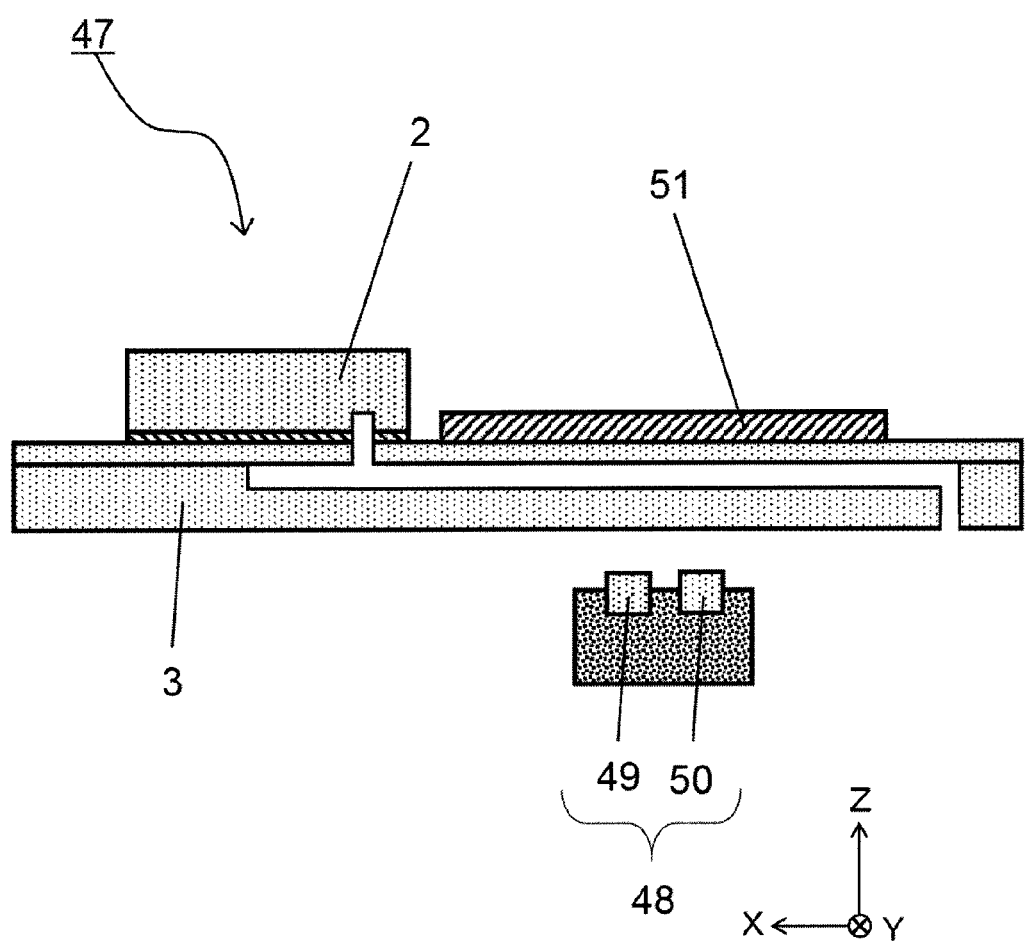
FIG. 8 illustrates a cross-sectional view showing an example of an inspection apparatus according to the one embodiment of the present disclosure.
Figure 9:
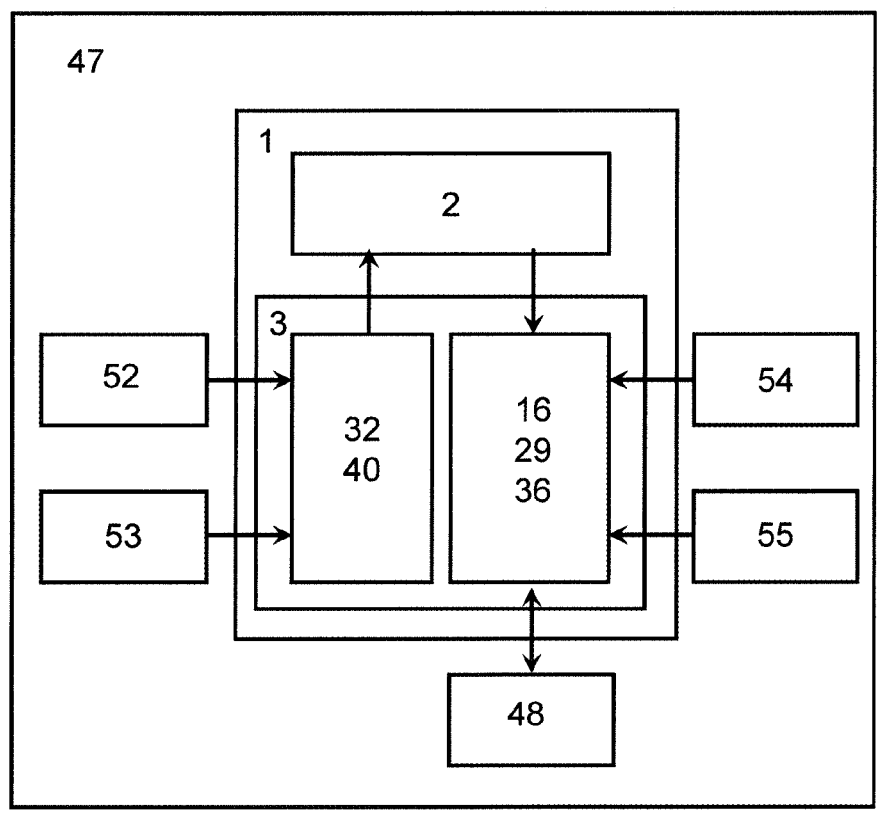
FIG. 9 illustrates a block diagram schematically showing a configuration of the example of the inspection apparatus according to the one embodiment of the present disclosure.

FIG. 8 and FIG. 9 schematically illustrate an inspection apparatus 47. FIG. 8 is a drawing of the inspection apparatus 47 with the same viewpoint as that in FIG. 2, and is a cross-sectional view. FIG. 9 illustrates a block diagram of a whole image of the inspection apparatus 47.

The inspection apparatus 47 includes the inspection flow path device 1 and an optical sensor 48. The optical sensor 48 includes a light-emitting element 49 and a light receiving element 50. As a result, firstly, the inspection flow path device 1 can separate the required microparticles (the first particles P1) from the sample. Then, the second flow path 16 is irradiated with light from the light-emitting element 49 of the optical sensor 48 to irradiate the microparticles flowing to the second flow path 16 of the inspection flow path device 1 with light, and the light receiving element 50 of the optical sensor 48 receives the light passing through the second flow path 16, thus the microparticles can be measured. Specifically, the light passing through the second flow path 16 is diffused or absorbed, for example, by the microparticles (the first particles P1) in the sample, thus the light intensity decreases. As a result, a standard curve indicating a relationship between the sample including the particles, the number of which is already known, and an attenuation amount of the light is previously prepared and the attenuation amount of the light in the inspection apparatus 47 is checked against the standard curve, thus the microparticles in the sample can be measured.

The light-emitting element 49 may be a light emitting diode (LED), for example. The light receiving element 50 may be a photo diode (PD), for example. The light receiving element 50 includes a semiconductor substrate including a region of one conductivity type and a region of the other conductivity type on an upper surface, for example, and the light-emitting element 49 includes a plurality of semiconductor layers formed on the semiconductor substrate described above.

A mirror member 51 is located on the second upper surface 19 of the second flow path device 3 in the inspection flow path device 1 in the present disclosure. The light-emitting element 49 and the light receiving element 50 of the optical sensor 48 in the present disclosure are located on a side of the second lower surface 20 of the second flow path device 3. Accordingly, the light receiving element 50 of the optical sensor 48 can receive the light passing through the second flow path 16 and reflected from the mirror member 51. The mirror member 51 may be formed of a material such as aluminum or gold, for example. The mirror member 51 can be formed by an evaporation method, a sputtering method or the like, for example.

The inspection apparatus 47 further includes a first supply unit 52 supplying the sample, a second supply unit 53 supplying the fluid of the pressing flow, a third supply unit 54 supplying the extrusion fluid, and a fourth supply unit 55 supplying the correction fluid, all of which are connected to the inspection flow path device 1. The first supply unit 52 is connected to the fourth flow inlet 34. The second supply unit 53 is connected to the sixth flow inlet 42. The third supply unit 54 is connected to the third opening 30. The fourth supply unit 55 is connected to the fifth flow inlet 38. The inspection apparatus 47 includes a controller, and the controller controls the first supply unit 52, the second supply unit 53, the third supply unit 54, the fourth supply unit 55, and the optical sensor 48.

The present disclosure is not limited to the embodiments described above, however, various alternation and modifications, for example, should be possible within the scope of the present disclosure.

Figure 10:
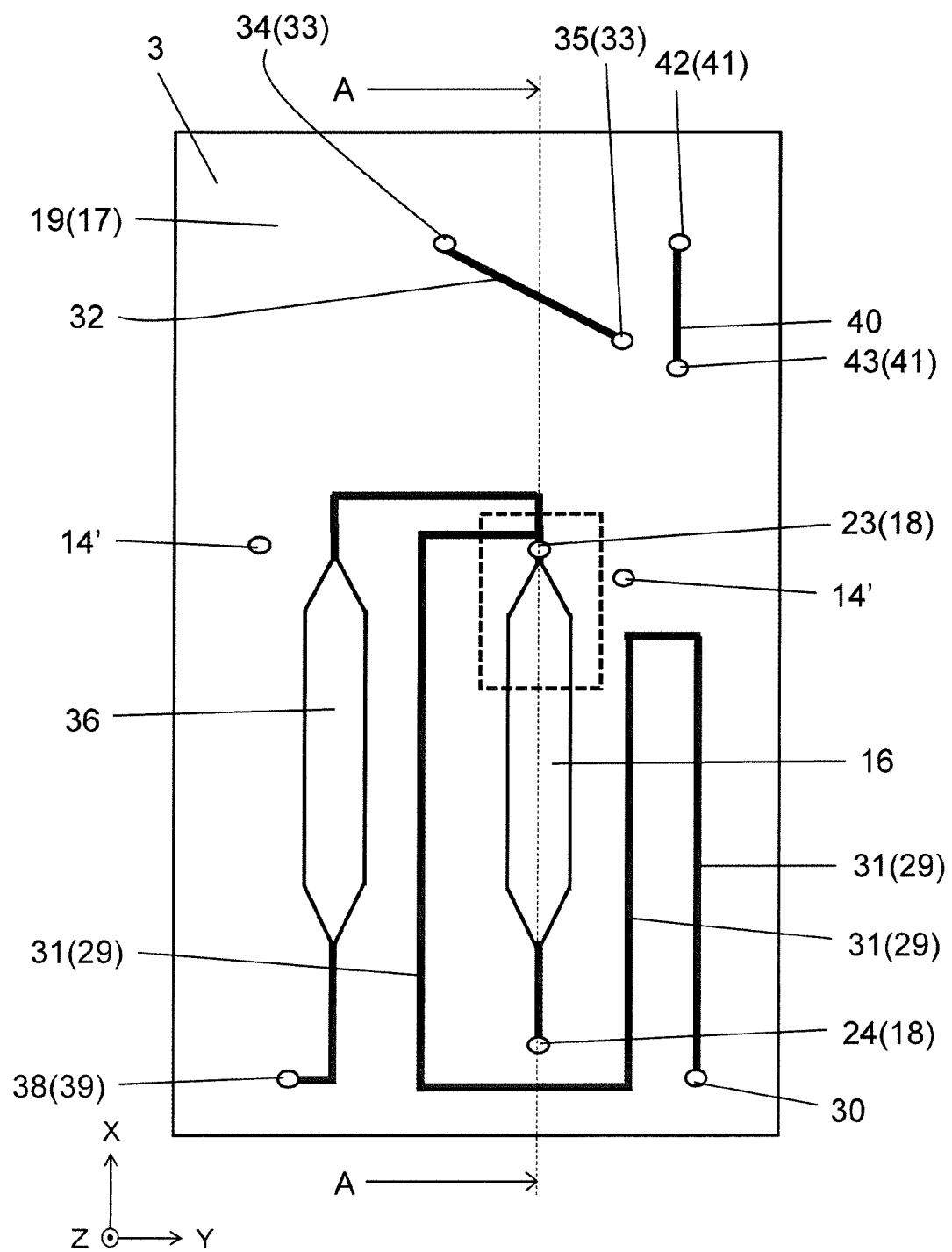
FIG. 10 illustrates a plan view showing an example of a second flow path device according to the other embodiment of the present disclosure.
Figure 11:
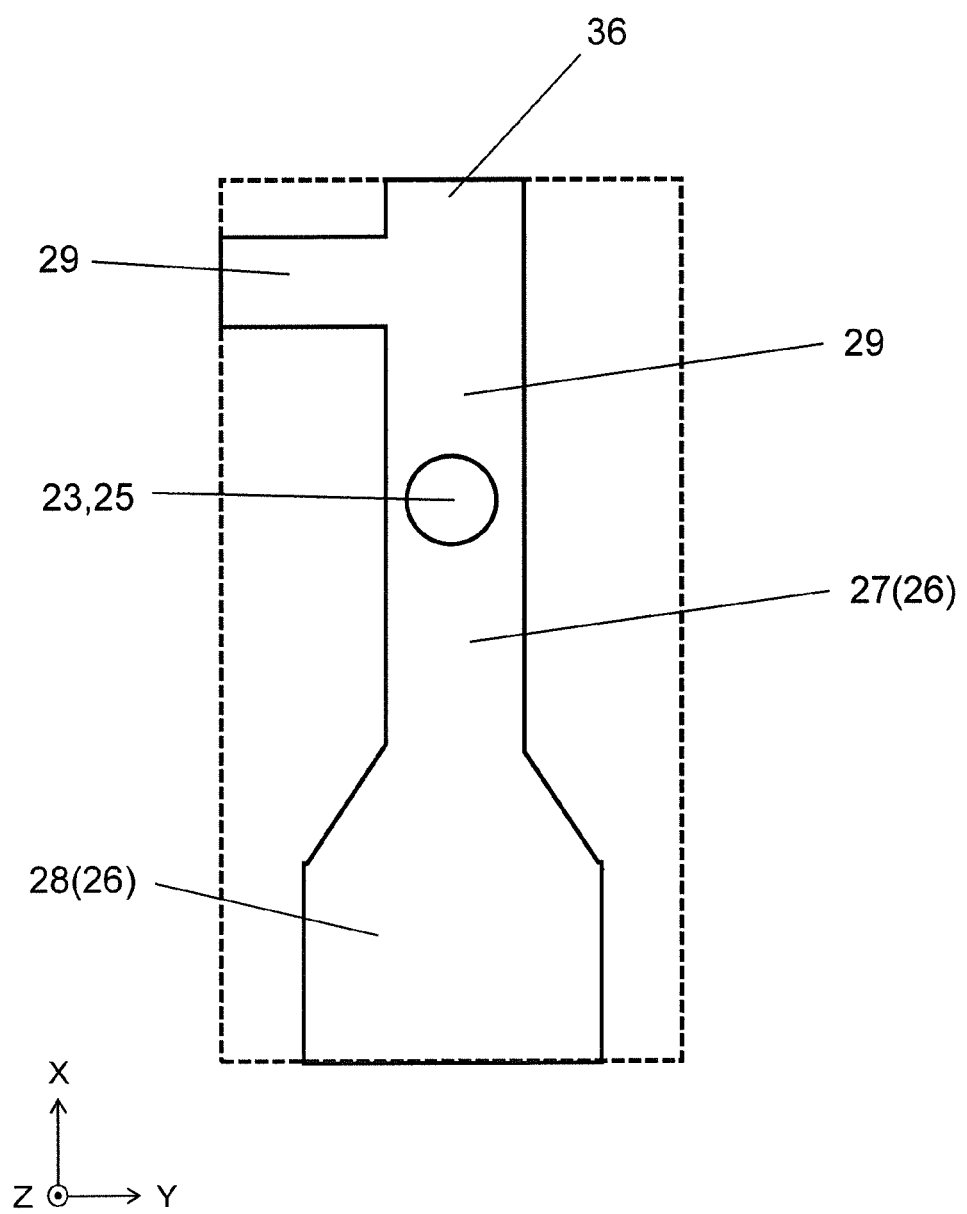
FIG. 11 illustrates a plan view showing a part of the example of the second flow path device according to the other embodiment of the present disclosure.

The above embodiments describe the example that one end of the fifth flow path 36 includes the fifth flow outlet 39, however, as illustrated in FIG. 10 and FIG. 11, one end of the fifth flow path 36 may be connected to the second flow path 16. As a result, the fluid in the fifth flow path 36 can be injected into the second flow path 16, thus the above configuration has a significant effect that a concentration of white blood cells in the second flow path 16 can be reduced. FIG. 10 and FIG. 11 are illustrated with the viewpoint similar to that in FIG. 6 and FIG. 7.

The above embodiments describe the example of including the fifth flow path 36 and the sixth flow path 40, however, the fifth flow path 36 may function as the sixth flow path 40. That is to say, the fifth flow path 36 and the sixth flow path 40 may constitute one flow path to be connected to the first flow path 4 (the first pressing flow inlet 15).

The above embodiments describe the example that the first flow path device 2 and the second flow path device 3 are bonded via the sheet member 44. However, as illustrated in FIG. 12, the second flow path device 3 may further include a convex portion 46 located on the second upper surface 19. The convex portion 46 may be inserted into the plurality of through holes 45. As a result, the first flow path device 2 and the second flow path device 3 can be connected to each other. The adhesive agent is not necessary if the connection of the first flow path device 2 and the second flow path device 3 can be secured only with the convex portion 46. In this case, the second flow path 16 and the second opening 18 may be located in the convex portion 46. FIG. 12 is illustrated with the same viewpoint as that in FIG. 5.

The first flow path device 2 and second flow path device 3 may be directed connected to each other. In this case, for example, the connection can be achieved by applying a silane coupling agent to at least one of the first lower surface 11 of the first flow path device 2 and the second upper surface 19 of the second flow path device 3.

The above embodiments describe the example that the first flow path 4 is formed by bonding the two substrates, however, the sheet member 44 may be used as one of the two substrates. That is to say, the first flow path 4 may be formed of one substrate and the sheet member 44.

The invention claimed is:

1. An inspection flow path device, comprising:
    a first flow path device having a plate-like shape and including a pair of first surfaces and a first flow path; and
    a second flow path device having a plate-like shape and translucency and including a pair of second surfaces and a second flow path; wherein
    the pair of first surfaces are located opposite to each other in a thickness direction of the first flow path device,
    the first flow path is located inside the first flow path device,
    the first flow path has a first opening and includes a branch flow path,
    the first opening is located in the pair of first surfaces,
    the pair of second surfaces are located opposite to each other in a thickness direction of the second flow path device,
    the second flow path is located inside the second flow path device and has a second opening located in the pair of second surfaces,
    one of the pair of first surfaces is located on one of the pair of second surfaces, and
    the first opening and the second opening are connected to each other.

2. The inspection flow path device according to claim 1, wherein
    the second flow path device further includes a first region and a second region each located on the one of the pair of second surfaces,
    the first region and the second region overlap with the second flow path in a transparent plan view, and
    the first flow path device is located only on the first region of the second flow path device.

3. The inspection flow path device according to claim 1, wherein
    a material of the first flow path device is different from a material of the second flow path device.

4. The inspection flow path device according to claim 1, wherein
    the pair of first surfaces of the first flow path device are made up of a first upper surface and a first lower surface, and
    the pair of second surfaces of the second flow path device are made up of a second upper surface and a second lower surface, and
    the first lower surface is located on the second upper surface.

5. The inspection flow path device according to claim 1, wherein
    the second flow path includes a vertical part and a planar part,
    the vertical part is connected to the second opening and extends in a thickness direction of the second flow path device, and
    the planar part is connected to the vertical part and extends along a planar surface direction along the one of the pair of second surfaces.

6. The inspection flow path device according to claim 5, wherein
    at least a part of the planar part connected to the vertical part has a width larger than that of the vertical part.

7. The inspection flow path device according to claim 5, wherein
    the planar part includes a first planar part connected to the vertical part and a second planar part connected to the first planar part and having a width larger than that of the first planar part.

8. The inspection flow path device according to claim 5, wherein
    the planar part includes a first planar part connected to the vertical part and a second planar part connected to the first planar part and having a height larger than that of the first planar part.

9. The inspection flow path device according to claim 1, wherein
    the first flow path further includes a first flow inlet which is an opening different from a first flow outlet when the first opening is defined as the first flow outlet, and
    the first flow outlet and the first flow inlet are located in the one of the pair of first surfaces.

10. The inspection flow path device according to claim 9, wherein
    the second flow path device further includes a fourth flow path including a fourth opening located in a surface of the pair of second surfaces identical to a surface where the second opening is located, and
    the fourth opening is connected to the first flow inlet.

11. The inspection flow path device according to claim 10, wherein
    the fourth flow path further includes a fourth flow inlet which is an opening different from a fourth flow outlet when the fourth opening is defined as the fourth flow outlet and exposed outside, and
    the fourth flow inlet and the fourth flow outlet are located in the surface of the pair of second surfaces identical to the surface where the second opening is located.

12. An inspection apparatus, comprising:
    the inspection flow path device according to claim 1; and
    an optical sensor irradiating the second flow path with light and receiving light passing through the second flow path.

13. The inspection flow path device according to claim 5, wherein the second opening has a width larger than that of the first opening.

14. The inspection flow path device according to claim 5, wherein the second flow path device further includes a third flow path located inside the second flow path device, and the third flow path is connected to a connection part between the vertical part and the planar part in the second flow path.

15. The inspection flow path device according to claim 14, wherein at least a part of the third flow path connected to the second flow path extends along an extension direction of the planar part.

16. The inspection flow path device according to claim 14, wherein at least a part of the third flow path connected to the second flow path has a shape identical to that of at least a part of the second flow path connected to the third flow path.

17. The inspection flow path device according to claim 14, wherein the third flow path includes a plurality of planar parts each extending in one direction and arranged in a direction intersecting with the one direction.

* * * * *